(12) United States Patent
Augst

(10) Patent No.: US 11,073,101 B2
(45) Date of Patent: Jul. 27, 2021

(54) METHOD, DEVICE AND MOBILE USER APPARATUS FOR ADAPTING A FUEL SUPPLY OF AT LEAST ONE MOTOR VEHICLE

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 461 days.

(21) Appl. No.: 15/462,990

(22) Filed: Mar. 20, 2017

(65) Prior Publication Data
US 2017/0276085 A1   Sep. 28, 2017

(30) Foreign Application Priority Data
Mar. 22, 2016   (DE) ..................... 10 2016 204 759.0

(51) Int. Cl.
*F02D 41/30* (2006.01)
*F02D 19/12* (2006.01)
(Continued)

(52) U.S. Cl.
CPC ......... *F02D 41/3005* (2013.01); *B60W 20/00* (2013.01); *F02D 19/12* (2013.01);
(Continued)

(58) Field of Classification Search
CPC ............................................ F02D 41/3005
(Continued)

(56) References Cited

U.S. PATENT DOCUMENTS 6,170,318 B1 * 1/2001 Lewis .................. G01N 27/126
340/632
8,392,105 B2 * 3/2013 Desborough ......... B60W 10/08
180/65.1
(Continued)

FOREIGN PATENT DOCUMENTS

DE   10 2009 052 047 A1   5/2011
DE   10 2012 208 337 A1   11/2012
WO   WO 2008/151375 A1   12/2008

OTHER PUBLICATIONS

Translation of DE102009052047B4 (May 9, 2019).*
(Continued)

*Primary Examiner* — Jean Paul Cass
(74) *Attorney, Agent, or Firm* — Crowell & Moring LLP

(57) ABSTRACT

A method and apparatus to determine values for at least one fuel use characteristic variable which represents a first fuel use process in a first vehicle, are provided. In addition, values are determined for at least one parameter which represents at least one peripheral condition of the fuel use in the first vehicle during the first fuel supply process. A mathematical relationship is determined between one or more supplied values of the at least one fuel use characteristic variable and the corresponding values of the at least one parameter. A profile data record including a data record and/or learning data is supplied on the basis of at least one determined mathematical relationship. At least one further fuel parameter of a fuel which is used by the first vehicle and/or by a second vehicle during a second fuel use process is adapted as a function of the supplied profile data record.

25 Claims, 3 Drawing Sheets

(51) Int. Cl.
*F02D 41/02* (2006.01)
*F02D 41/00* (2006.01)
*B60W 20/00* (2016.01)
*F02D 41/24* (2006.01)
*G07C 5/00* (2006.01)
*H04M 1/72409* (2021.01)
*F02D 41/26* (2006.01)
*H04B 1/3822* (2015.01)
*B60W 50/14* (2020.01)

(52) U.S. Cl.
CPC ....... *F02D 41/0025* (2013.01); *F02D 41/021* (2013.01); *F02D 41/2451* (2013.01); *F02D 41/26* (2013.01); *G07C 5/00* (2013.01); *H04B 1/3822* (2013.01); *H04M 1/72409* (2021.01); *B60W 2050/146* (2013.01); *F02D 41/2487* (2013.01); *F02D 41/266* (2013.01); *F02D 2200/0611* (2013.01); *F02D 2200/701* (2013.01)

(58) Field of Classification Search
USPC .......................................................... 701/33
See application file for complete search history.

(56) References Cited

U.S. PATENT DOCUMENTS

| | | | | |
|---|---|---|---|---|
| 8,402,936 | B2* | 3/2013 | Nakamura | F02N 11/0837 123/179.4 |
| 8,527,132 | B2* | 9/2013 | Mineta | B60W 50/0097 700/291 |
| 8,534,199 | B2* | 9/2013 | Kumar | B61L 3/006 105/27 |
| 8,886,392 | B1* | 11/2014 | Maeng | G06Q 10/20 701/29.1 |
| 2003/0187567 | A1* | 10/2003 | Sulatisky | F02D 41/1405 701/104 |
| 2004/0044423 | A1* | 3/2004 | Wintrich | F23N 1/002 700/29 |
| 2005/0055874 | A1 | 3/2005 | Bekemeyer | |
| 2008/0036593 | A1* | 2/2008 | Rose-Pehrsson | G08B 25/00 340/540 |
| 2008/0319605 | A1* | 12/2008 | Davis | G01F 9/008 701/33.4 |
| 2009/0112450 | A1 | 4/2009 | Connor | |
| 2009/0125180 | A1* | 5/2009 | Berkobin | B60W 40/12 701/33.4 |
| 2011/0101166 | A1 | 5/2011 | Schwarze et al. | |
| 2011/0136026 | A1* | 6/2011 | Betts | H01M 8/04373 429/423 |
| 2011/0264358 | A1 | 10/2011 | Nishida | |
| 2012/0303245 | A1 | 11/2012 | Wang et al. | |
| 2015/0053304 | A1 | 2/2015 | Huwyler et al. | |
| 2016/0010574 | A1* | 1/2016 | Kumar | B61L 3/006 701/104 |
| 2016/0131483 | A1* | 5/2016 | Jordan | G06F 17/00 701/33.4 |
| 2019/0063354 | A1* | 2/2019 | Augst | B60W 10/06 |

OTHER PUBLICATIONS

Translation of DE 102012208337 (May 9, 2019).*
Google Machine Translation of Chinese Patent Pub. No. CN105114194A that was filed in 2015 (hereinafter the "194 publication").*
Google Machine Translation of Japanese Patent Pub. No. JP2017095095A filed in 2011.*
German-language Search Report issued in counterpart German Application No. 10 2016 204 759.0 dated Nov. 10, 2016 with partial English translation (Thirteen (13) pages).

* cited by examiner

METHOD, DEVICE AND MOBILE USER APPARATUS FOR ADAPTING A FUEL SUPPLY OF AT LEAST ONE MOTOR VEHICLE

CROSS REFERENCE TO RELATED APPLICATIONS

This application claims priority under 35 U.S.C. § 119 from German Patent Application No. 10 2016 204 759.0, filed Mar. 22, 2016, the entire disclosure of which is herein expressly incorporated by reference.

BACKGROUND AND SUMMARY OF THE INVENTION

The invention relates to a method, a device and a mobile user apparatus for adapting a fuel supply of at least one vehicle.

Modern drive systems of motor vehicles with internal combustion engines can adapt automatically to parameters of a fuel. In this context, the internal combustion engines of these modern vehicles can use, in particular, different types of a classic liquid fuel (for example, Super 95, 98, E10, ethanol in the form currently widespread, for example, in South America, etc.) or natural gas. Several types of fuel within one class can be mixed with one another more or less satisfactorily.

A quality level of the various fuels is different. Considerable quality differences can occur even within one standard. Both the standards of the fuel types and their actual quality can also change significantly during the life cycle of a motor vehicle.

The object of the present invention is to provide a method, a corresponding device and a mobile user apparatus for adapting a fuel supply of at least one vehicle, which permit improved fuel use of the vehicle.

This and other objects are achieved by a method, a corresponding device and a mobile user apparatus for adapting a fuel supply of at least one vehicle in accordance with embodiments of the invention.

The invention is, according to first and second aspects, distinguished by a method and a corresponding device for adapting a fuel supply of at least one vehicle. In this context, values are determined for at least one fuel use characteristic variable which represents a first fuel use process in a first vehicle. Furthermore, values are determined for at least one parameter which represents at least one peripheral condition of the fuel use in the first vehicle during the first fuel supply process. A mathematical relationship is determined between at least one or more of the values of the at least one fuel use characteristic variable and the corresponding values of the at least one parameter. A profile data record including a data record and/or learning data is supplied on the basis of the at least one determined mathematical relationship. At least one second fuel parameter of a fuel which is used by the first vehicle and/or by a second vehicle during a second fuel use process is adapted as a function of the supplied profile data record.

In this context, the adaptation of the second fuel parameter can preferably include selective adaptation of one or more fuel parameters from a multiplicity of various fuel parameters of the fuel which is used or can be used. The adaptation particularly preferably includes open-loop or closed-loop control or an open-loop control process or a closed-loop control process. Open-loop control or closed-loop control can also include relatively long time periods or a plurality of energy use cycles in this context.

Such adaptation can be carried out in the method, for example, by means of adaptation of the fuel which is to be used in the first vehicle or in a second vehicle (during a specific fuel use process). Adaptation of the at least one second fuel parameter can occur here within and/or outside the first or second vehicle.

In the method, variable adaptation over time of the at least one second fuel parameter particularly preferably occurs, which adaptation can occur, in particular, as a stepped or continuous change of the fuel parameter.

Supplying fuel can include here filling a fuel tank of a vehicle and/or adding at least one fuel component to a fuel from a fuel tank of the first or of the second vehicle and/or feeding fuel into an internal combustion engine of the first or of the second vehicle. Adapting the second fuel parameter can be represented by specification of a new value or of an additive, multiplicative, logarithmic, exponential etc. factor or function, which factor or function is applied to a current, preset or known parameter value.

In this way, an increase in efficiency during the fuel use can advantageously be achieved and a contribution can be made to environmental protection, in particular by reduction of $CO_2$ and/or pollutants. A further advantage is that the fuel use, in particular wear and/or consumption of vehicle components of vehicles during a life cycle of the vehicles can be adapted to changed fuel standards and/or new types of fuel. It is specifically advantageous that no hardware adaptation of the vehicle is necessary, which permits rapid introduction into the market, and also that vehicles which are already in series production can use the method for adapting the fuel use without hardware retrofitting. The advantages of the method can therefore also be rolled out to vehicles which are in series production (without hardware retrofitting).

The first vehicle or second vehicle can each have one or more internal combustion engines. In addition, the first and/or second vehicle can each have an electric drive and therefore be embodied as a hybrid vehicle.

The values of the at least one fuel use characteristic variable and the values of the at least one parameter are preferably determined for a multiplicity of operating phases of the first vehicle, wherein the determination also includes sensing with, for example, a sensor device. The at least one fuel use characteristic variable can be representative of at least one exhaust gas characteristic variable and/or one torque characteristic curve which is actually reached and/or at least one sensing variable of a knocking sensor of the internal combustion engine of the vehicle and/or one or more ignition angles and/or ignition times.

A plurality of parameters which each represent a condition or peripheral condition of the fuel use with respect to the first vehicle and/or the internal combustion engine and/or the surroundings of the first vehicle during the first fuel use process are preferably determined. The parameters therefore characterize peripheral conditions which were present during the respective fuel use. The parameter can include an operating variable of the internal combustion engine and/or of the vehicle, for example a rotational speed and/or a torque and/or a tire temperature and so on. Alternatively or additionally, the parameter can include a surrounding state variable, for example humidity, external temperature and/or air pressure and so on. The at least one parameter can represent a permanent or variable peripheral condition of the fuel use with respect to the first vehicle and/or the internal combustion engine and/or the surroundings of the first vehicle.

A slowly variable peripheral condition, for example an age of the vehicle or of its components (for example of an engine oil and/or of a consumable) or a less variable driving profile or regular routes and so on can be considered here as a permanent peripheral condition. Quickly variable conditions, for example an external temperature, an air pressure, an air humidity or driving profiles characterized by particular features or routes can be considered to be variable peripheral conditions.

Ambient conditions (temperature, air pressure, moisture and so on) in which various cars and various fuels and drive systems have to function and which can vary within wide ranges can advantageously be taken into account during the adaptation of the fuel use, in particular during the fuel use.

The values of the at least one fuel use characteristic variable are stored and/or supplied, for example with assignment to the respectively associated values of the at least one parameter of the fuel use. The mathematical relationship between the at least one supplied value, or plurality of supplied values, of the at least one fuel use characteristic variable and the corresponding values of the at least one parameter can be determined in this way.

In one advantageous variant of the method, one or more values can be determined for at least one first fuel parameter which represents a fuel which is used during the first fuel use process in the first vehicle. This first fuel parameter is the actual variable of the fuel parameter which was used during a previous fuel use.

In the method, a reference is preferably established between the profile data record and one or more corresponding values of the at least one determined second fuel parameter. Such a reference can be an assignment of one or more determined second fuel parameters to a corresponding profile data record or the determination of a specific mathematical function.

In particular, the profile data record can comprise one or more second fuel parameters in an explicit or implicit form.

The mathematical relationship between at least one of the supplied values, or a plurality of the supplied values, of the at least one fuel use characteristic variable particularly preferably includes a reference to one or more corresponding values of the at least one determined second fuel parameter.

The value or values of the at least one first fuel parameter can each be determined after a refueling process. The at least one first fuel parameter can be representative of proportions of various fuel types and/or a mixing ratio of predefined fuel components in the respectively currently used fuel of the vehicle. The value of the at least one fuel parameter can include a fuel type and/or octane number and/or viscosity and/or portion of a fuel component and so on. By means of the profile data record, it is therefore possible, for example, to determine a change of the at least one fuel parameter, which change is necessary to approximate the determined fuel use characteristic variable, in particular a fuel use characteristic variable, to a predefined set point fuel use characteristic variable. The set point fuel use characteristic variable can be an optimized value for the fuel use characteristic variable.

The mathematical relationship can comprise a predefined mathematical principle, rule, prescription and/or relationship between one or more fuel use characteristic variables and one or more of the corresponding parameters. The mathematical relationship can represent in this context coefficients relating to one or more, in particular predetermined, equations, polynomials or a simulation. This involves, in particular, an expediently embodied mathematical relationship. In a simplified case, the mathematical relationship can comprise an assignment between one or more fuel use characteristic variables and one or more of the corresponding parameters and fuel parameters which are related, in particular, to the same time intervals. The mathematical relationship can be configured in such a way that a result of the mathematical relationship represents a dependence between two or more parameters and/or fuel parameters and two or more corresponding fuel use characteristic variables. The mathematical relationship particularly preferably represents a solution space of a multiplicity of the properties of the first vehicle with respect to one or more selected fuel use processes. In particular, with the mathematical relationship it is possible to describe one or more properties of the first vehicle at least partially in a system-theoretical fashion (relationship between the resulting input variables and output variables).

The supplied data record can include here all the characteristic variables of the mathematical relationship, or the characteristic variables of the mathematical relationship which have been selected according to specific criteria. In particular, a selected data record can include a selection of the characteristic variables of the mathematical relationship which are optimized as a function of an application.

The learning data can represent here in an indirect or direct fashion a change in the data record, in particular by an update information with respect to a previously stored or supplied data record.

At least some of the values of the data record can preferably be determined as a function of a respective first fuel use process, for example within a time interval, and the learning data relating to a change in the data record in the first vehicle can be supplied in response thereto.

The supplied profile data record can include here at least one data record and/or learning data which is determined on the basis of one or more determined mathematical relationships. In this context, the profile data record can include, for example, the data of the data record and/or the learning data and a use specification for the data.

Expressed in simplified terms, the supplied profile data record can represent a specific "wealth of experience" (corresponding to data record) or a new "experience" or "updating of experience" (corresponding to learning data) of the first vehicle with respect to the fuel use of the first motor vehicle under different peripheral conditions. Vehicles have specific properties which change over time and which usually become more pronounced with increasing age of the vehicle. The fuel use of the vehicle can be adapted by means of the determined profile data record taking into account these specific properties in such a way that one or more aspects of the fuel use of the first vehicle and/or the second vehicle are improved and/or optimized.

The profile data record can be completed and/or updated, for example, continuously, in an event-controlled fashion or at regular time intervals. In particular, the profile data record can be updated as a function of respective new learning data. For example, a profile data record which has already been stored in a second vehicle can be updated, as a function of a transferred learning data record which has been determined as a function of the data of a first vehicle. This provides a particularly high efficiency level and rapid and effective updating of the method. In this context, merely one profile data record can be transferred with the learning data on the basis of the data of a first vehicle, which learning data includes changing or updating a previous profile data record for a second vehicle, in response to which the changing of only the affected part of the previous profile data record can be updated in the changed fashion.

This can be achieved in that data records which result from initial data representing a combination of the plurality of various permanent peripheral conditions and variable peripheral conditions can be acquired and then applied, in particular applied with maximum precision, to a multiplicity of combinations, in particular new combinations, of permanent and variable peripheral conditions.

The values of the at least one fuel use characteristic variable can be supplied with an assignment to the respectively associated values at a predefined first data interface. The determined profile data record can be supplied at a predefined second data interface. The first data interface and the second data interface can be embodied as one or two interfaces. A control device of the vehicle can have the first data interface, and a mobile user apparatus can have the second data interface. In particular, the profile data record can be determined from a mobile user apparatus. Alternatively or additionally, the mobile user apparatus can be designed to determine, as a function of supplied vehicle sensor data, the values of the at least one fuel use characteristic variable and/or to sense and/or to determine the values of the at least one parameter.

The profile data record can in this way also be determined as a function of data of at least one vehicle sensor and/or as a function of user settings which can be predefined, in particular, by means of the mobile user apparatus. In this context, the users can change their settings by means of a human-machine interface of the first vehicle and/or by means of a mobile user apparatus.

An exchange of the profile data records which have been determined for various first motor vehicles can occur by means of a mobile user apparatus (Smartphone, tablet, "plug-in navigation system" etc.). In this context, these can also be read in for a specific purpose by other users (with a corresponding app) and used.

The profile data record can be received or selectively queried by a further mobile user apparatus of a user of the second vehicle. By means of the further mobile user apparatus of the user of the second vehicle, it is therefore possible to change one or more vehicle settings of the second vehicle via a predefined interface of the second vehicle.

In the event that values of the at least one first fuel parameter and/or parameter have not been sensed and/or determined or have not been sensed and/or determined to a sufficient degree, for example in a new vehicle, in particular at the starting point of the method, the values of the at least one first fuel parameter and/or parameter can also be acquired from a simulation or from values of another vehicle. In a simplified case, these values can be input and/or imported and corrected later by genuine measured values.

In one advantageous refinement according to the first and second aspects, the profile data record also represents the adaptation of the second fuel parameter of the fuel as a function of a plurality of alternative peripheral conditions of the fuel use.

In a further advantageous refinement according to the first and second aspects, the profile data record also represents a mathematical relationship of the fuel-use parameter of the fuel and/or of the first fuel parameter as a function of one or more operating parameters of the drive system of the first vehicle.

In a further advantageous refinement according to the first and second aspects, the learning data represents at least one adaptation of the at least one second fuel parameter of the fuel and a corresponding adaptation of at least one operating parameter of the drive system of the first vehicle.

The learning data preferably includes one or more quantitative measures which represent a change in the fuel use variable as a function of one or more measures of an operating parameter of the drive system of the first vehicle. In addition, in the method, an adaptation of one or more operating parameters of the drive system of the first vehicle and/or of the second vehicle, or an optimized adaptation of the operating parameters also as a function of further predefined criteria can be made to the supplying of a profile data record and/or of the learning data.

In a further advantageous refinement according to the first and second aspects, the profile data record represents one or more adaptation variants of the second fuel parameter of the fuel and of a corresponding adaptation of an operating parameter of the drive system of the first vehicle or of the second vehicle with respect to at least one peripheral condition which gives rise to an improvement in a fuel use characteristic variable in the first vehicle and/or a fuel use characteristic variable in the second vehicle, in particular with respect to a specific second fuel use process.

In particular, the learning data represents a plurality of potential change possibilities of one or more adaptation variants of the second fuel parameter and of a corresponding adaptation of an operating parameter of the drive system of the first vehicle which, in the case of a current, previously determined or assumed fuel use process with specific parameters give rise to an improvement in the fuel use characteristic variable during a second fuel use process.

The profile data record and/or the learning data can represent, in particular, a multi-dimensional solution space within which the operating parameters of the drive system of the first vehicle and/or of the second vehicle can also be adapted as a function of further (constant or variable) criteria relating to a second fuel use process.

It is therefore possible to adapt an internal-combustion-engine-related and/or an electric-motor-related drive system of the first or second vehicle and thereby respectively achieve an optimum operating mode and drive mode. In particular, in the case of vehicles which can be driven by two or more energy sources, for example types of gasoline, natural gas and electrical charge, a vehicle driver is usually overloaded or unnecessarily burdened by the process of finding a respectively advantageous, let alone optimal, operating mode and drive mode. The operating parameter of the drive system can include one or more configuration data items, characteristic curves, closed-control parameters, etc. of the drive system.

In a further advantageous refinement according to the first and second aspects, a fuel supply in the first vehicle and/or in the second vehicle with at least two different fuel types is also varied as a function of the supplied profile data record.

In particular, the variation of at least two fuel types relates to a specific refueling process of the first vehicle and/or of the second vehicle. In particular, time intervals for the use of at least two different fuel types and/or specific mixtures of fuel types can also be varied.

In a further advantageous refinement according to the first and second aspects, the composition of the fuel which is currently fed, or will be fed in the near future, into an internal combustion engine, in particular by means of variable addition over time of at least one additional component to the fuel, is also varied in a second fuel use process in the first vehicle and/or in the second vehicle as a function of the supplied profile data record or the learning data.

In particular, the use of at least two different fuel types in the first vehicle and/or in the second vehicle can be varied by means of an addition, in particular variable over time, of at least one additional component to the fuel (for example lubricant, specific nanoparticles, etc.). The addition of one or more additional components, in particular variable over time, can occur, for example, in the vehicle fuel tank, within a fuel line or a mixing chamber or directly within an internal combustion engine.

In the method, at least one second fuel parameter can be adapted as a function of the profile data record and/or of the learning data, wherein the resulting fuel parameter which arises, for example, as a result of addition of a component or a fuel parameter which arises overall during mixture of fuel components is adapted.

In this context, the variation of the composition of the fuel which is currently fed, or will be fed in the near future, into the internal combustion engine particularly preferably takes place in an infinitely variable fashion or in small steps as a function of the changing of the at least one peripheral condition within a fuel use phase. In this context, depending on the supplied profile data record, in particular by means of an interpolation method or extrapolation method, it is possible to determine or execute an optimized function for changing one or more second fuel parameters of the fuel supply of the first vehicle and/or second vehicle as a function of one or more peripheral conditions. The invention therefore also comprises a control of a device of the gas station for changing the fuel parameters.

This has the advantage that in each case a suitable mixture of fuel types or components, in particular for a gasoline, can always be obtained in the fuel tank of the corresponding first or second vehicle.

The fuel types or the fuel mixture which is to be selected or mixed here can be indicated in the simplest case, for example on a display for the user, with an operator control interface in the vehicle, on the mobile user apparatus or display of the gas station. The variation of fuel types or fuel mixture can also preferably be carried out by an energy station, in particular a gas station, by transmitting data relating to the requested fuel types or fuel mixtures. In this context, specific quantities of specific fuel types can be called from an energy station as a function of data which is determined and transferred indirectly or directly within the scope of the method. This has the advantage that even an optimization potential which is small from the point of view of a user can be used. A normal user would not be motivated to mix together two fuels at the gas station in a precisely suitable fashion such as, for example, a 1-5% optimization potential, even if such user were fully acquainted with this, since the process would possibly be time-consuming and complicated.

Special additives which are to be added to the fuel tank by the vehicle user can also be reliably calculated.

By means of an improved fuel use, it is possible at least to reduce environmentally damaging fuel additives. At present, methyl tertiary butyl ethers (MTBE) and/or ethyl tertiary butyl ethers (ETBE), which are considered to be environmentally damaging, are added in order to increase what is referred to as the knock resistance.

The profile data record is particularly preferably determined as a function of the fuel use of at least two different fuel types and/or under significantly different peripheral conditions.

Fuel types can also, for example, for the most part be compatible with one another and capable of being mixed more or less satisfactorily with one another, such as E10 and Super, Super-Plus, etc.

In a further advantageous refinement according to the first and second aspects, values are determined and/or supplied for at least one second parameter which represents a current or predicted peripheral condition of the fuel use of the first vehicle or of the second vehicle. The at least one second fuel parameter of the fuel which is used by the first vehicle and/or by a second vehicle during the second fuel use process is adapted as a function of the values of the at least one second parameter.

This has the advantage that, on the basis of the profile data record of the first vehicle, the fuel use for the first vehicle and/or the second vehicle can be adapted as a function of the respectively expected peripheral conditions for the corresponding vehicle. In particular, the first or second vehicle can be refueled with at least two mixable types of fuel (for example E10 and Super with the recommended proportion). It is also possible to reliably determine special additives to be added to the fuel tank, by taking into account the expected peripheral condition, and for them to be added to the fuel tank contents automatically or by the vehicle user.

In a further advantageous refinement according to the first and second aspects, at least one optimum time or at least one optimum time interval is determined for a refueling process between two fuel use phases for the first vehicle or the second vehicle as a function of the values of the at least one second parameter and as a function of one or more optimization criteria.

In particular, the respective point in time or the respective time interval can be determined with respect to at least two sections of a route to be traveled on and/or with respect to at least two time periods with different peripheral conditions. This advantageously makes it possible to determine a point in time or a time interval for refueling, at which point in time or time interval the refueling of the suitable, in particular optimized fuel types and/or fuel mixture, can bring about improved fuel use. It is therefore possible, for example in the case of an expected change of weather, for refueling to result in a fuel mixture in the fuel tank which gives rise to improved fuel use under the changed weather conditions. For example navigation data of the respective vehicle and/or calendar data and/or weather data and/or data relating to environmental zones and so on can be used to determine the values of the at least one second parameter.

In a further advantageous refinement according to the first and second aspects, a current composition of a fuel in the fuel tank of the first vehicle or of the second vehicle is determined. At least one optimized second fuel parameter is determined as a function of values of predefined third parameters for a future fuel use phase, which respectively represents a predicted peripheral condition of the fuel use during the future fuel use phase, and one or more predefined optimization criteria. For future refueling which takes place in preparation for the future fuel use phase, proportions of various fuel types and/or a mixture ratio of predefined fuel components of the fuel to be refueled are/is determined as a function of the current composition of the fuel and the at least one second fuel parameter.

In this context, a fuel use phase represents the time between two directly successive refueling processes. It is advantageous here if the future fuel use phase directly follows the current fuel use phase.

The optimized fuel parameter can be representative of proportions of various fuel types and/or of a mixture ratio of predefined fuel components in the fuel of the vehicle.

The current composition of the fuel in the fuel tank of the vehicle can be determined in such a way that the mixing ratio, for example of a Super Fuel and an E10 gasoline, in the fuel tank is determined. The mixing ratio is preferably determined without sensors which are required for chemical analysis of the fuel. The current mixing ratio is preferably determined as a function of refueling data and/or billing data, stored in a vehicle computer and/or Smartphone and/or in a payment system, for one or more preceding refueling processes. It is therefore possible, for example, to determine tables mathematically on the basis of stored predefined relationships, for example in a Smartphone.

In particular, during each refueling process, it is possible to determine which mixture, in particular of the fuel types which can be mixed with one another is or was located in the fuel tank, and under which prevailing peripheral conditions the mixture was used. This can be determined, for example, to a high degree automatically on the basis of supplied fuel output quantities. In addition, by evaluating refueling data the mixtures prevailing in the fuel tank can be determined at various time intervals and, for example, the at least one optimized fuel parameter can be determined for the future fuel use phase also as a function of data of one or more preceding fuel use phases which have already taken place, and during which, for example, very different peripheral conditions prevailed. This has the advantage, in particular, that even relatively rare combinations of peripheral conditions, for example a Siberian cold spell, low humidity and low air pressure can be taken into account during the determination of the at least one optimized fuel parameter for the future fuel use phase.

Alternatively or additionally, the fuel composition in the fuel tank of the vehicle can be determined as a function of at least one current control variable of the valve controller (for example statistical closed-loop control data), and/or a current ignition angle and/or current values of an adaptive control of the ignition times, and/or at least one current value of the fuel/air mixture, and/or at least one current value of a lubricant circulation and/or of an engine oil circuit or transmission oil circuit, and/or at least one current control variable of the transmission, and/or a current addition of an additive.

The fuel composition in the fuel tank of the vehicle can be determined as a function of the data of the drive system of the vehicle. In this context, the current values preferably relate to the values set during the last fuel use cycle. The control variables of the valve controller can include statistical closed-loop control data. The current control variables of the transmission can represent, in particular, shifting processes. The additive can include nanoparticles which are mixed in a chronologically adaptive fashion.

This determination of the fuel composition has the advantage that no initial data is necessary. The control variables can include, for example, relationships between the closed-loop control data (set point values, mean values, etc.) which are currently set or are set in a time interval.

Depending on the profile data record, a desired optimum is determined for the fuel use of the present vehicle and for the expected peripheral conditions of the fuel use during the future fuel use phase.

It is determined, in particular, which portions of which fuel types and in which quantities are to be added to the portions already present in the fuel tank, so that the best possible fuel mixture with respect to the desired cost optimization function for the fuel use is obtained in the fuel tank for one or more of the subsequent fuel use phases.

In this context, the mixture can relate both to the mixture of specific standard types of fuels as well as to specific determined fuel components.

In particular, a direct or indirect data communication between the vehicle and/or a mobile user apparatus and a refueling device of the energy station can be provided. For this purpose, refueling data which is representative of a point in time of the refueling, a refueling quantity and/or a fuel type which has been refueled are preferably acquired.

The fuel characteristic variables of the composition of the fuel tank contents can be determined together with the refueling data which has already been stored, for example, in the mobile user apparatus, or can be called, relating to the composition of at least two fuel types. The fuel characteristic variables can relate here to actual chemical substances and mixtures or can be use variables of the fuel types, such as, for example, octane numbers, viscosity at various temperatures, etc.

In a further advantageous refinement according to the first and second aspects, the at least one fuel use characteristic variable is representative of a degree of wear and/or of consumption and/or a remaining service life of a vehicle component.

It is therefore possible for information or a statement about a change in the state and/or a degree of wear of the respective vehicle component and/or a remaining service life of at least one component resulting from the respective fuel use are determined as a function of the supplied profile data record. The vehicle component can include a vehicle engine and/or a drive component and/or a catalytic converter and/or a consumable, in particular a filter and/or a vehicle fluid, in particular an engine oil or a cooling fluid.

In a further advantageous refinement according to the first and second aspects, a state and/or a degree of wear and/or a remaining service life or a change in the state and/or the degree of wear and/or the remaining service life of one or more predefined vehicle components is determined, for example, by a vehicle component of a specific type, in particular over a relatively long time period, as a function of one or more of the profile data records.

The "state" can here refer to, but is not limited to, a "permanent state," in particular a physical or chemical state. In particular, the vehicle components are ones which relate directly to a fuel use process. In particular, these can be components of the internal combustion engine, of the drive and/or of the actuators of the chassis.

The change of the state and/or of the degree of wear can also include determining, in particular estimating, the remaining service life. The remaining service life can relate, for example, to a distance traveled (kilometers) and/or to an absolute rotational speed and/or units of time.

A change of a state and/or a degree of wear and the estimation of the (remaining) service life can be determined at least partially with means of the mobile user apparatus of the user (driver of the vehicle). In this context, profile data records, in particular also further data items relating to a multiplicity of the vehicles can be read in with means of e.g., the mobile user apparatus. In this context, for example very efficient and precise predictions can be determined about the remaining service life of specific vehicle components (of a specific vehicle or vehicle type). It is therefore possible for data relating to changes of a state and/or of a degree of wear and/or an estimation of the (remaining) service life also to be acquired for vehicles without corresponding data acquisition, IT infrastructure, etc.

The profile data record can alternatively or additionally be determined as a function of information which represents a change of a state and/or of a degree of wear of the respective vehicle component, wherein this information can relate here, in particular, to, preferably cumulated wear and/or consumption of vehicle components. A corresponding mathematical relationship particularly preferably represents the dependencies between at least one peripheral condition of the fuel use of a fuel use process and the change of a state and/or of a degree of wear.

The profile data record can alternatively or additionally also be determined as a function of further information derived from the information. In this context, numerous methods of statistical mathematics can be applied. In this context, the normalized and/or adapted dependencies can be determined. Subsequently, optimum values can be obtained for overall optimum fuel, fuel composition or fuel mixture, for example also from statistical information from a large number of vehicles which preferably are of the same type and which are operated under different peripheral conditions, and such optimum values can be applied, in particular also with respect to conditions which are expected in the future.

Information relating to an improvement of specific parameters of the vehicle components can advantageously also be derived as a function of one or more profile data records. In particular, in this context the quality of the vehicle components during development or production can be selectively and efficiently improved as a function of the determined data. Valuable data and/or information relating to the improvement of specific vehicle components, which directly or indirectly relates to supplier products or third-party products, can also be acquired. For example, weak points of vehicle components can also be detected easily and/or unambiguously and evaluated to the advantage of the consumer and/or vehicle manufacturer.

In a further advantageous refinement according to the first and second aspects, the at least one parameter is representative of a state and/or a remaining service life of one or more vehicle components of the first vehicle.

The fuel use characteristic variable therefore also permits a statement to be made about an influence of a state and/or a remaining service life of the respective vehicle components on the fuel use. The vehicle component can include a vehicle engine and/or a drive component and/or a catalytic converter and/or a consumable, in particular a filter and/or a vehicle fluid, in particular an engine oil or a cooling fluid. It is possible to determine at least coarse values for the age, the degree of wear and/or remaining service life or rated service life of one or more vehicle components.

In a further advantageous refinement according to the first and second aspects, the at least one parameter of the fuel use represents an energetic efficiency level of the respective fuel use process in the first vehicle.

In this context, fuel use parameters representing at least one energetic efficiency level in a first vehicle with respect to the corresponding peripheral conditions (which have respectively prevailed here) can be taken into account during the determination of the mathematical relationship.

For example, the determined mathematical relationship represents a characteristic diagram or a group of characteristic diagrams which describe a relationship between (specific) parameters of the energetic efficiency level to the (specific) parameters of the peripheral conditions of the fuel use.

The corresponding profile data record preferably relates to at least one fuel parameter. The determined mathematical relationship particularly preferably includes a mathematical dependence on the fuel used (in the first fuel use process).

The at least one parameter of the energetic efficiency level can be represented, for example, as a relationship between an (for example chemical) energy content of the fuel and an energy level which is actually acquired in a first energy use process.

This advantageously permits the energetic efficiency level of the respective fuel composition in the specific vehicle to be supplied together with the conditions or peripheral conditions during the fuel use which were respectively present for the profile data record of the vehicle. This can particularly advantageously be used for adaptation of a fuel use of the vehicle, in particular at very high or very low rotational speeds, since a method of functioning and efficiency level of an engine is very fuel-dependent at very low and very high rotational speeds depending on the operating temperature. The energetic efficiency level can also represent two, three or more characteristic variables which relate to different rotational speeds or to rotational speed statistics (as a peripheral condition). (Useful) energy can be determined over time for the respectively present peripheral conditions from an integral value. This energy value can be directly or indirectly a component of the profile data record.

In a further advantageous refinement according to the first and second aspects, the profile data record is respectively determined and supplied for a multiplicity of first vehicles. A resulting profile data record is determined and supplied as a function of at least some of the respective profile data records, and the at least one second fuel parameter of the fuel which is used by the first vehicle and/or by a second vehicle during the second fuel use process is adapted as a function of the supplied resulting profile data record.

The transmission, reception or exchange and aggregation of the respective profile records can preferably be configured by means of at least one mobile user apparatus. In this context, targeted exchange of optimization information can also occur between two or more users. As a result, this data which is determined for exchange can also be configured in an extremely compact fashion and, if necessary, absolutely non-critically in terms of data protection technology. The exchange can occur, for example, via a Cloud network, an Internet portal, a method for reading out info-memories, fault memories, a method for managing so-called adaptive data of a vehicle, teleservice reporting, WLAN router, Bluetooth, etc.

In a further advantageous refinement according to the first and second aspects, the at least one second fuel parameter of the fuel which is used by the first vehicle and/or by a second vehicle during a second fuel use process is adapted as a function of authentication and/or compatibility testing of the supplied profile data record or of the resulting profile data record.

In particular, the proportions of the fuel types and/or of a fuel mixture in the fuel tank of the second vehicle and/or the operating parameters of the drive system of the second vehicle can be adapted as a function of the authentication and/or the compatibility testing of the supplied profile data record. The authentication can be carried out, for example, with a digital vehicle key which includes the access authorization to the second vehicle.

In a further advantageous refinement according to the first and second aspects, a set of changes of setting for the fuel use of the first vehicle or of the second vehicle is determined as a function of the supplied profile data record of the first vehicle or of the resulting profile data record, and the at least one second fuel parameter of the fuel which is used by the first vehicle and/or by a second vehicle during the second fuel use process is adapted as a function of a predefined selection of changes of setting.

The selection of the adaptation measures can be predefined by a predefined operator control activation of an input device of the respective vehicle or of the mobile user apparatus of a user of the respective vehicle. In this context, a transfer or a change of settings can be displayed, in particular, graphically on a display device of the respective vehicle and/or of the respective mobile user apparatus. The changes of setting which are determined in advance for the respective vehicle and/or an anticipated result of the changes of setting can also be displayed. The changes of setting can also be selected individually or together by the user here.

In a further advantageous refinement according to the first and second aspects, a graphic user information item which represents one or more changes with respect to the second fuel use process is determined and output, which user information has been implemented or is implemented as a function of the supplied profile data record or is proposed to the user.

In particular, the variation of the fuel types or fuel mixture which are to be selected or mixed here can be displayed to the user on a display with an operator control interface in the vehicle, on the mobile user apparatus or display of the gas station. In this context, qualitative and/or quantitative measures of the change can be represented in the user information, for example in a graphic form.

In particular, in this context a dependence between a value of at least one fuel use characteristic variable which represents a first fuel use process in the vehicle of the user and a value of at least one parameter which represents at least one peripheral condition of the fuel use in the vehicle of the user during the first fuel use process, and the change of at least one fuel parameter can be represented in the user information, at least qualitatively, in particular also quantitatively.

In this context, the vehicle of the user can appropriately be the first vehicle or the second vehicle.

The user information can represent here specific changes or new values in a graphic form (for example bars, circular diagrams, color coding, etc.). In this context, a simplified graphic information item which is easily or intuitively understandable in particular even to lay people can be output.

It is therefore possible to display to the user of the respective vehicle, in particular graphically, what will change on his motor vehicle and, if appropriate, how the changes of setting will have effects, and on what these effects will be. The user can then make a decision about his or her choice globally or selectively, for example as a combination of two or more decisions, for example by selecting and/or moving a selection slider.

In a further advantageous refinement according to the first and second aspects, a further profile data record is determined for a further vehicle as a function of the profile data record of the first vehicle and/or the resulting profile data record and a predefined conversion data record, wherein a vehicle type of the further vehicle differs from the vehicle type of the first vehicle.

The profile data record of the first vehicle, which represents, in particular, a first vehicle type, can therefore be converted to a further vehicle and/or a further vehicle type by means of the conversion data record. The conversion data record can preferably include a scientific relationship, for example a mathematical function and/or a pivotable table, etc., which is acquired on a simulation basis and/or a statistical basis. The conversion data record represents data which is suitable for mapping the data of the profile data record of the first vehicle or of the first vehicle type onto the data of the further profile data record of the further vehicle or of the further vehicle type. Initial data of the profile data record and/or initial data of the conversion data record can particularly preferably be based on a data record which is determined or assumed on the basis of theoretical insights and is optimized iteratively and/or recursively by aggregation with the respective, in particular current, statistical data. This has the advantage that even profile data records of vehicles of different types can be used for the mutual improvement of the data of the profile data records. This can give rise to more rapid improvement of the data of the respective profile data records.

In a further advantageous refinement according to the first and second aspects, the determined profile data record is interpolated and/or extrapolated for values of at least one predefined parameter which represents a current or a future peripheral condition of the fuel use of the first vehicle. The at least one second fuel parameter of the fuel which is used by the first vehicle and/or by a second vehicle during the second fuel use process is adapted as a function of the interpolated and/or extrapolated profile data record. In particular, the proportions of the fuel types and/or the fuel parameter values for the current or future fuel use are also determined.

This is advantageous because exactly identical peripheral conditions and configurations of the drive system rarely repeat themselves. In particular, the learning data of the profile data record can be interpolated and/or extrapolated. The proportions of the fuel types or the fuel parameter values of the fuel mixture are preferably determined as a function of one or more optimization criteria. The determination of the proportions and/or of the fuel parameter values can preferably be carried out by interpolation of the basic data from two or more earlier peripheral conditions which in each case have a relatively high value and a relatively low value compared to a previously determined peripheral condition. This permits a very high degree of improvement or optimization even when there is little input data.

In a further advantageous refinement according to the first and second aspects, values for a predefined set of parameters of the fuel use and/or of first fuel parameters are determined, and on the basis of iterative optimization a global optimum of the at least one fuel use characteristic variable for at least two optimization criteria is determined as a function of at least one portion of the parameters and/or of the first fuel parameters of the predefined set.

In this context, firstly in each case a scalar optimum of the at least one fuel use characteristic variable can be determined for an individual optimization criterion and, on the basis of one or more provisionally determined scalar optimum values, it is possible for the parameters to be adapted in two or more steps until a global optimum is reached or approached. In this context, the provisionally determined scalar optimum values can relate to different optimization criteria, for example energy efficiency level or reduction wear and tear on the vehicle etc.

This has the advantage that a very large number of parameters of the fuel use, which characterize the peripheral conditions of the fuel use, and complex mathematical relationships can be evaluated efficiently.

Data relating to the optimization can also be transferred to further devices and/or mobile user apparatuses and/or vehicles and/or exchanged between the devices and/or mobile user apparatuses and/or vehicles.

In a further advantageous refinement according to the first and second aspects, the at least one parameter of the fuel use includes a parameter of at least one use byproduct and/or an information item which is representative of handling the at least one use byproduct.

The at least one parameter of the fuel use can therefore include parameters of a catalytic converter setting and/or an information item which is representative of a degree of soiling of a filter and/or a quantity of further waste products. This makes it possible to use means of the vehicle to make possibly dangerous fuel use products less damaging under the prevailing peripheral conditions or peripheral conditions which are determined in advance for the near future.

In a further advantageous refinement according to the first and second aspects, the at least one fuel use characteristic variable is determined as a function of a predefined statistical function which represents one or more static relationships between at least two of the first fuel parameters and/or at least two of the parameters of the fuel use and/or between at least one of the first fuel parameters and at least one of the parameters of the fuel use which are determined during a plurality of fuel use phases.

In this way, the influence of, and mutual influencing between, the respective first fuel parameters and the other parameters on the fuel use can advantageously be quantified and evaluated. This can be used for further development of fuel types, supplier products and third-party products, and for better use of the vehicle potentials.

In a further advantageous refinement according to the first and second aspects, the fuel use characteristic variable is determined as a function of one or more variables which is representative of at least one exhaust gas characteristic variable and/or one torque characteristic curve which is actually reached and/or at least one detection variable of a knocking sensor of the internal combustion engine of the vehicle and/or one or more ignition angles and/or ignition times.

According to an exemplary aspect of the method of the invention, it is therefore possible to adapt an internal-combustion-engine-related and/or electric-motor-related drive system of the first or second vehicle, and thereby respectively obtain an optimum operating mode and drive mode. In particular in the case of vehicles which can be driven by two or more energy sources, for example types of gasoline, natural gas and electrical charge, a vehicle driver is usually overloaded or unnecessarily burdened with a process of finding a respective advantageous, let alone optimal, operating mode and drive mode. The operating parameter of the drive system can include one or more configuration data items, characteristic curves, closed-loop control parameters etc. of the drive system.

The invention is distinguished according to a third aspect by a mobile user apparatus which is configured to determine values for at least one fuel use characteristic variable assigned to respectively associated values of at least one parameter. The fuel use characteristic variable represents a first fuel use process in a first vehicle, and the at least one parameter represents a peripheral condition of the fuel use during the first fuel use process of the first vehicle. The mobile user apparatus is also configured to determine a mathematical relationship between at least one supplied value, or a plurality of supplied values, of the at least one fuel use characteristic variable and the at least one parameter, to supply a profile data record. The profile data record includes a data record and/or learning data on the basis of the at least one determined mathematical relationship, at a second data interface. Alternatively or additionally, the mobile user apparatus is configured to determine information which is utilized to adapt at least one second fuel parameter of a fuel which is used by the first vehicle and/or by a second vehicle in a second fuel use process, and to supply the information at the second data interface.

The mobile user apparatus is therefore designed to carry out at least some of the steps of the method for adapting a fuel supply of at least one vehicle according to the first aspect. Advantageous refinements of the first aspect also apply here to the third aspect. In particular, the mobile user apparatuses can be designed to determine the respective profile data record and/or the accumulated profile data and supply it at the second data interface for the first and/or further vehicle. The mobile user apparatus can for this purpose have a wire-bound or wireless interface. The mobile user apparatus can include a Smartphone, a tablet PC, a garment with a suitable electronic device, a Smart watch and/or a portable navigation device and so on. A transmitter part and/or a sensor system and/or computing resources and/or a transceiver unit and/or authentication method of the mobile user apparatus can advantageously therefore be used or shared.

According to a further aspect, the invention is distinguished by a computer program, wherein the computer program is designed to carry out the method according to the first aspect or an advantageous refinement of the method according to one or more further features of the method. In particular, the computer program is a software program which can run, for example, as an app (=application) for one or more types of mobile user apparatuses. This apparatus can preferably be a brand-specific software program, in particular also configured for handling customer data, user data or billing data.

According to a further aspect, the invention is distinguished by a computer program product which includes executable program code, wherein when the program code is executed by a data processing device the program code executes the method according to the first aspect or an advantageous refinement of the method according to the first aspect. The computer program product includes, in particular, a medium which can be read by the data processing device and on which the program code is stored.

According to a further aspect, the invention is distinguished by a program product which includes an authorized access right to stored data of the computer program product.

The vehicle is preferably a motor vehicle or motor cycle. This results in multiple advantages which are described explicitly within the scope of this document and multiple further advantages which can be understood by a person skilled in the art. A particularly large advantage results during the application to a vehicle fleet (a multiplicity of first vehicles and/or a multiplicity of second vehicles), for example associated with one or more, for example, cooperating, brands or members of an organization or of a group of a social network, under a multiplicity of peripheral conditions.

The means outside the vehicle can include an external computer, memory unit, infrastructure sensor system and/or other known or future devices.

Alternatively or additionally, the handling of the profile data records can also be determined, transferred or applied as a function of recognition information and/or authentication methods, in particular as a function of an ID code of the wireless communication of the road user and/or a SIM card number/MAC address relating to the user. In order to further improve data protection, in particular only statistical or anonymized data may be allowed to be exchanged.

The invention also includes determining (and if appropriate retrieving) adaptive mixtures or mixture ratios. These can also be implemented by the energy station.

The invention also includes in this context a method for determining optimized fuel compositions, even within one type of energy.

The fuel mixture relates, in particular, to a composition of chemical substances or sub-components, for example:
  components with different octane numbers, and/or
  ethanol components (and respectively related types), and/or
  methyl tertiary butyl ethers (MTBE) and/or ethyl tertiary butyl ethers (ETBE), and/or
  lubricants and additives, and/or
  exhaust-gas-reducing active substances, and/or
  "psychological" active substances.

The means within the vehicle (or devices within the vehicle) can be, for example, the vehicle sensor system or a corresponding adding apparatus (for example an accessory) which moves with the vehicle.

The use of the fuel between two fuel supply processes, in particular under more or less constant peripheral conditions, can be considered to be a fuel use phase here.

The method can also be applied, in principle or in an analogous fashion, to other types of energy (and quite different vehicles).

The wireless transmission/reception can be carried out, for example, by means of WLAN, LTE, G3, etc. or by means of other standards or types of communication, in particular also directly or indirectly by means of wireless routers or Internet applications.

Other objects, advantages and novel features of the present invention will become apparent from the following detailed description of one or more preferred embodiments when considered in conjunction with the accompanying drawings.

DETAILED DESCRIPTION OF THE DRAWINGS

Elements of the same design or function are provided with the same reference symbols in all the figures.

Figure 1:
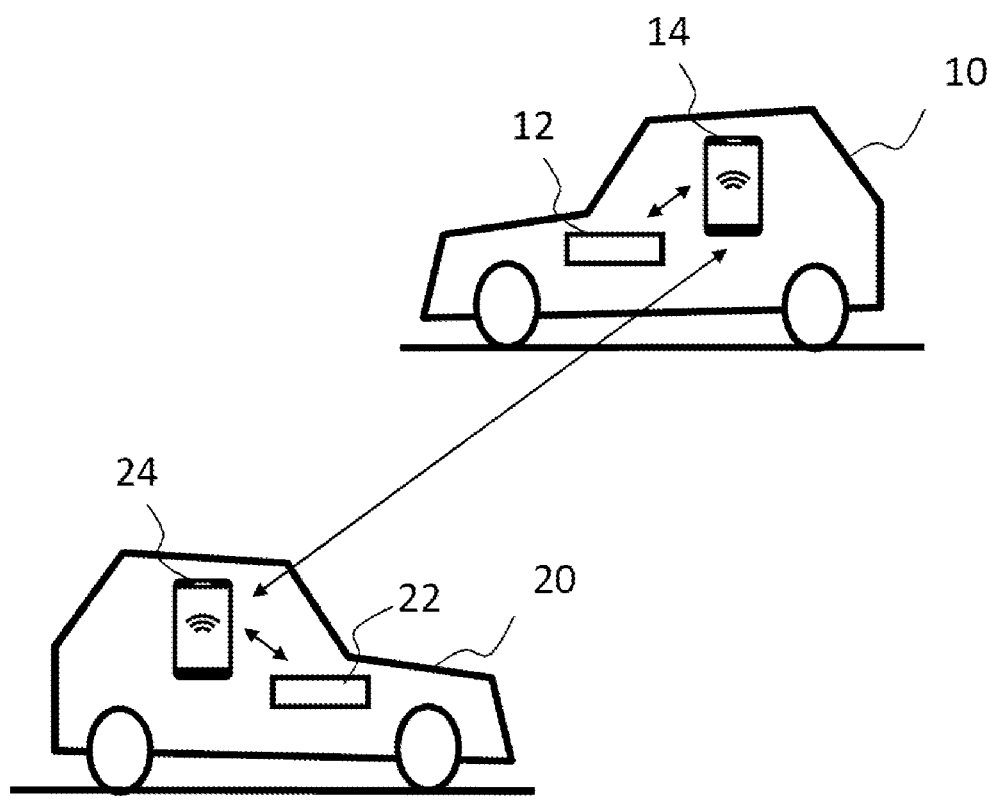
FIG. 1 is a schematic view of an exemplary embodiment of a system for adapting a fuel supply of at least one vehicle.

FIG. 1 shows an exemplary embodiment for a system for controlling a fuel use process of at least one vehicle.

The system includes at least one first vehicle 10 and optionally at least one second vehicle 20. The first vehicle 10 and the second vehicle 20 have, for example, at least an internal combustion engine. In addition, the first or the second vehicle 10, 20 can have an electric drive. The first vehicle 10 has a first control device 12 and the second vehicle 20 has a second control device 22. The system optionally has mobile user apparatuses which can be used by a respective user of the first vehicle 10 or of the second vehicle 20 for adapting the fuel supply of the respective first vehicle 10 or of the respective second vehicle 20. The respective mobile user apparatus 14, 24 can include, for example, a Smartphone and/or tablet PC and/or a plug-in navigation apparatus.

The first control device 12 is designed, for example, to sense and/or determine values, which represent a first fuel supply process in the first vehicle 10, for at least one fuel use characteristic variable K.

In addition, the first control device 12 is designed, for example, to sense and/or determine values for at least one parameter P which represents at least one peripheral condition of the fuel use in the first vehicle 10 during the first fuel use process.

The first control device 12 is designed, for example, to store the values of the at least one fuel use characteristic variable K in assignment to the respectively associated values of the at least one parameter P and to supply them at a first data interface.

In addition, the first control device 12 is designed to adapt, in response to reception of a profile data record Rec supplied at a second data interface, as a function of the supplied profile data record Rec, at least one second fuel parameter F2 of a fuel which is used by the first vehicle 10 during a second fuel use process.

This can take place, in particular, in such a way that the control device determines, as a function of the profile data record Rec, control signals, which are transferred to a gas station device. The fuel is then output by the gas station device as a function of the transferred control signals.

In particular, the first control device 12 is designed also to adapt the at least one second fuel parameter F2 of the fuel as a function of at least one second parameter P2_1, P2_2 which represents a current or predicted peripheral condition of the second fuel use process.

The values of the at least one second parameter P2_1, P2_2 are determined, for example, as a function of at least one predefined route attribute of a route section which is traveled along or is to be traveled along and/or as a function of travel times of the first or second vehicle 10, 20. In particular, in this way an operating mode of the first vehicle 10 or of the second vehicle 20 can be adapted as a function of the at least one predefined route attribute of the route section which is traveled along or is to be traveled along and/or as a function of the travel times. For example, during the adaptation of the fuel use, it is possible to take into account whether the journey is during the day or at night. In addition, it is possible to take into account specific target values for noise load, CO2 emissions, fine-dust emissions, etc. on specific route sections. It is therefore also possible to take into account information about the environmental zones of specific route sections. For example, an environmental zone for the first vehicle 10 or of the second vehicle 20 can be determined and in response the portion of a specific fuel type which is suitable for the respective route sections can be determined. In particular, in this context the route sections with specific environmental zones 1, 2, 3, 4 can be determined from a navigation map and/or from the back end and/or by means of a road sign identifier, for example also with a camera. The optimized portions of the fuel types can subsequently be determined and/or the vehicle 10, 20 can correspondingly switch fuel types over as it travels along the route.

Alternatively or additionally, the values of the at least one second parameter P2_1, P2_2 can be determined as a function of, for example, a driving statistic of the first vehicle 10, or of the second vehicle 20, and/or a vehicle setting with respect to a drive mode of the first vehicle 10 or of the second vehicle 20, and/or at least one previously calculated route for the first vehicle 10 or for the second vehicle 20, and/or a predicted external temperature, and/or current exhaust gas data of the first vehicle 10 or of the second vehicle 20, and/or data of a knocking sensor of the internal combustion engine of the first vehicle 10 or of the second vehicle 20, and/or calendar data of a user of the first vehicle 10 or of the second vehicle 20, and/or driver settings of the first vehicle 10 or of the second vehicle 20, and a use of the first vehicle 10 or of the second vehicle 20 for a specific purpose.

The driving statistic can include, for example, a route length statistic and/or speed statistic and/or an altitude profile statistic (mountainous/flat) and/or travel density statistic (urban/rural). The vehicle settings such as, for example, comfort, sporty, normal, can be determined on the basis of settings of a driving permission switch which is used at present and/or has been used in the past. The at least one previously calculated route can include a determined most probable route of the first vehicle 10 or of the second vehicle 20. The current exhaust gas data can be determined, for example, by means of a closed-loop controlled catalytic converter of the first or second vehicle 10, 20. The driver settings can also include direct user settings and current user requirements. The use for the specific purpose may be, for example, a deployment of a rescue service.

For the determination of the values of the at least one second parameter P2_1, P2_2, for example, the mobile user apparatus 14, 24 can be configured to retrieve the corresponding data from the first vehicle 10 or the second vehicle 20, for example from a predefined software application (also referred to as an app), from specially administered data records or from the Internet via a wireless interface and to predefine the data correspondingly and combine it with special or specific scientific relationships. In this context, for example optimum values for the outputting of fuel can be displayed, read out and/or transferred directly or indirectly to the gas station for a fuel supply process. In the case of rental vehicles, it is also preferably possible to take into account calendar data or plans of one or more subsequent users and/or data of the following user or users in the ways described above.

A first mobile user apparatus 14 which is used by a respective user of the first vehicle 10 to adapt the fuel use of the first vehicle 10 is designed, for example, to receive the values of the at least one fuel use characteristic variable K which are supplied at the first interface and to determine a mathematical relationship between at least one supplied value, or a plurality of supplied values, of the at least one fuel use characteristic variable and the associated values of the parameters P and supply it as a data record and/or learning data. In addition, the first mobile user apparatus 14 is configured, for example, to supply the profile data record Rec at a predefined second interface.

The second control device 22 of the second vehicle 20 is configured, for example, to receive the profile data record Rec which is supplied at the second data interface, from the first mobile user apparatus 14, and to adapt, as a function of the supplied profile data record Rec, the at least one second fuel parameter F2 of the fuel which is used by the second vehicle 20 during a second fuel use process. This can take place, in particular, in such a way that the control device determines, as a function of the profile data record Rec, control signals which are transferred to the gas station device. The fuel is then output by the gas station device to the second vehicle 20 as a function of the transferred control signals.

Alternatively or additionally, the respective first mobile user apparatus 14 or the respective second mobile user apparatus 24 can be designed to adapt, as a function of the profile data record Rec and the values of the at least one second parameter P2_1, P2_2, the at least one second fuel parameter of the fuel which is used by the first vehicle 10 or the second vehicle 20 during a second fuel use process. This can take place, in particular, in such a way that the respective mobile user apparatus respectively determines, as a function of the profile data record Rec, control signals which are transferred to a gas station device. The fuel is then output by the gas station device to the first vehicle 10 or second vehicle 20 as a function of the transferred control signals.

The apportioning, as described above, of the functions of the first control device 12, second control device 22, the first mobile user apparatus 14 and the second mobile user apparatus 24 is exemplary and can also take place another way. Further variants are, for example, that the profile data record Rec is determined with means of the first vehicle 10, in particular also as a function of the data of the first mobile user apparatus 14, and the profile data record Rec or information dependent thereon is transferred to a fixed memory unit or computing unit, for example a Cloud, a back end or Internet portal or directly to the second mobile user apparatus 24 of the second user or directly or indirectly to a computing unit of the second vehicle 20.

Figure 2:
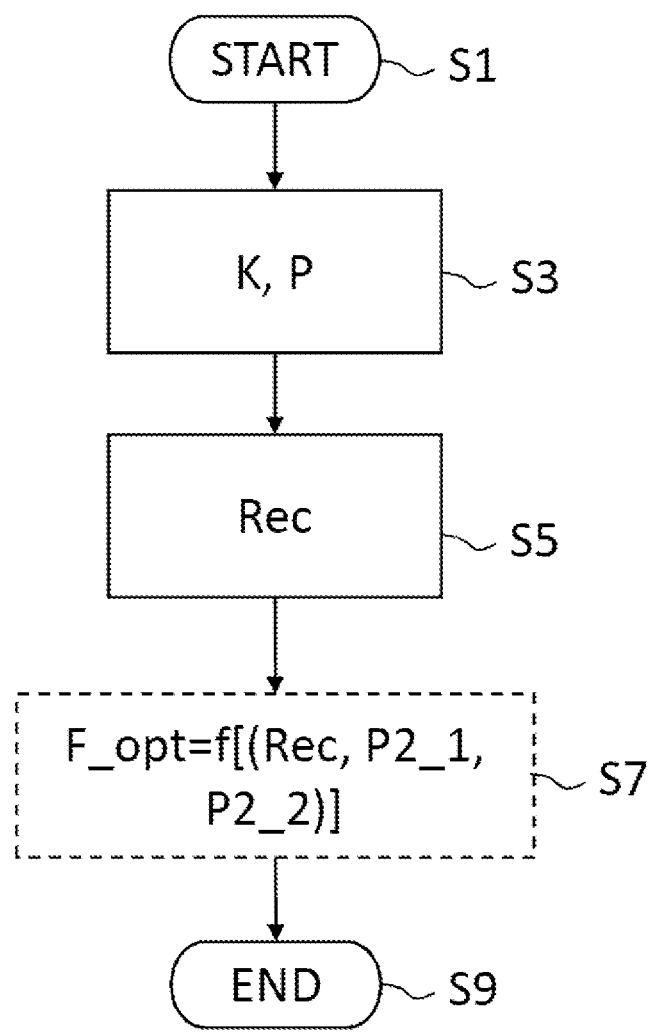
FIG. 2 is an exemplary flowchart of a program for adapting a fuel supply of at least one vehicle for a mobile user apparatus.

FIG. 2 shows an exemplary flowchart of a program for adapting a fuel supply of at least one vehicle for the first mobile user apparatus 14.

The program is started in a step S1.

In a step S3, values of at least one predefined fuel use characteristic variable K, preferably of a plurality thereof, representing fuel use in a first vehicle 10, are read in. Respectively associated values of at least one parameter P, preferably a plurality thereof, are read in and/or stored in assignment to the values of the fuel use characteristic variables. The parameters P represent a peripheral condition or condition of a first fuel use process. The peripheral condition or condition relates, for example, to the first vehicle 10 and/or the internal combustion engine and/or the surroundings of the first vehicle 10.

Furthermore, the first control device 12 is designed, for example, to sense and/or determine values of at least one first fuel parameter F1 which represents a fuel which is used during the first fuel supply process in the first vehicle 10.

In addition to the values of the fuel use characteristics variables, the respectively associated values of at least one predefined first fuel parameter F1, preferably a plurality thereof, are then read in and/or stored. The fuel parameter F1 or fuel parameters F1 represent a fuel which is used during the first fuel use process in the first vehicle 10.

The respective fuel use characteristic variables K are supplied, for example, by the first control unit 12 of the first vehicle 10.

The at least one fuel use characteristic variable K is representative, for example, of at least one exhaust gas characteristic variable and/or one torque characteristic curve which is actually reached and/or of at least one detection variable of a knocking sensor of the internal combustion engine of the first vehicle 10 and/or of one or more ignition angles and/or ignition times.

The exhaust gas characteristic variable can include data from a closed-loop controlled catalytic converter of the first vehicle 10 and/or the data of the closed-loop controlled catalytic converter in combination with further data of the first vehicle 10 or of the first mobile user apparatus 14. In particular, the at least one exhaust gas characteristic variable is suitable for describing properties of the exhaust gas of the first vehicle 10. The torque characteristic curve which is actually obtained can be dependent on feeding-in of fuel, in particular with respect to different operating modes of the drive system of the first vehicle 10. The torque characteristic curve is preferably stored in assignment to these parameters P.

These fuel use characteristic variables K can preferably be sensed with means within the first vehicle 10 and/or determined from the data acquired with means of the first vehicle 10, for example with a computing unit of the first vehicle 10 or with the first mobile user apparatus 14, for example via an interface, similar to an on-board diagnostics interface. The determined fuel use characteristic variables K can be, expressed in scientific terms, sequences or time functions as well as relationships, expressed scientifically, for example, as formulas or formula coefficients, between two or more characteristic variables or one or more characteristic variables and as a function of one or more parameters P which each represent a condition of the fuel use or peripheral condition of the fuel use. Statistical data and/or dependency data and/or correlation data can also be collected, read out and used as the data for the knock sensor, ignition angle or ignition times. For example, the so-called OBD (On-Board Diagnostics) interface is also suitable for this.

The values of the parameters P can be supplied, for example, by the first vehicle 10 by means of the navigation device and/or the first control device 12 and/or the on-board computer of the first vehicle 10. Alternatively or additionally, the values of the parameters P can be supplied, for example, by second vehicle-external devices, for example a back end of the vehicle manufacturer. Alternatively or additionally, the values of the parameters P can be supplied by the mobile user apparatus itself.

The value or values of the at least one first fuel parameter F1 can each be determined according to a refueling process. The at least one first fuel parameter F1 can be representative of proportions of various fuel types and/or of a mixing ratio of predefined fuel components in the respectively currently used fuel of the vehicle.

The value of at least one first fuel parameter F1 can comprise a fuel type and/or octane number and/or a viscosity and/or a proportion of a fuel component and so on.

The current composition of the fuel in the fuel tank of the vehicle can be determined in such a way that the mixing ratio, for example, of a Super fuel and an E10 gasoline, in the fuel tank is determined. The mixing ratio is preferably determined without sensors which are required for chemically analyzing the fuel. The current mixing ratio is preferably determined as a function of refueling data and/or billing data, stored in a vehicle computer and/or Smartphone and/or in a payment system for one or more last refueling processes. It is therefore possible, for example, to determine, for example, tables mathematically on the basis of stored predefined relationships in the Smartphone.

In a step S5, a mathematical relationship is determined between at least one supplied value, or a plurality of supplied values, of the at least one fuel use characteristic variable and the corresponding values of the at least one parameter P. In addition, in the step S5, the profile data record Rec comprising a data record and/or learning data is supplied on the basis of the at least one determined mathematical relationship.

The mathematical relationship is determined as a function of at least some of the stored or supplied values of the at least one fuel use characteristic variable K and the associated values thereof.

In particular, coefficients are determined for the profile data record on the basis of a predefined mathematical relationship which represents, for example, predefined equations, polynomials or simulations.

The profile data record Rec can represent, for example, at least one change in the fuel use characteristic variable K as a function of an adaptation of the at least one second fuel parameter F2.

The profile data record Rec can represent, for example, one or more adaptation variants of the at least one second fuel parameter F2, which variant or variants gives/give rise to optimization of the fuel use characteristic variable K.

The profile data record Rec can also represent just one difference, in particular an optimizing change, for example for carrying out a specific optimization step. As a result, this data which is intended for exchange can be configured extremely compactly and/or in a fashion which is absolutely noncritical for data protection.

Therefore, the data which is available in the first mobile user apparatus 14 can also be used, or data which the first mobile user apparatus 14 can determine or request in a wireless fashion from a further vehicle-external device, for example back end, Cloud, customer portal, etc.

The data which is read in from the first vehicle 10 or determined in the first vehicle 10 and which is read out with the first mobile user apparatus 14, for example the Smartphone of the user, for example via the on-board diagnostic interface or WLAN etc. can be used together with further data to determine the profile data record Rec with application software and then distribute the profile data record Rec if appropriate. The profile data record Rec and, in particular, the learning data are determined together with the parameters P of the fuel use which characterize the peripheral conditions which can be also at least partially sensed with the first mobile user apparatus 14 and/or conditioned by the first mobile user apparatus 14.

A resulting profile data record Rec_res can optionally be determined in the step S5 in that a resulting profile data record Rec_res is determined as a function of a plurality of profile data records which have been determined and supplied by respective first vehicles 10.

The profile data record Rec can be fused and/or aggregated with earlier profile data records of this type, for example by means of a software application and/or transferred by means of a customer portal, Cloud or back end. Subsequently, the profile data records of the first vehicles 10 can be used by other users or vehicles.

In this case, the first vehicles 10 are preferably each of the same type or related type. The respective profile data records may have been determined here taking into account identical or different peripheral conditions. This has the advantage that the profile data records can be much more precise and comprehensive. The learning data which has been determined in the first vehicle 10 under different peripheral conditions over a large number of fuel use phases can also be aggregated with one another, for example combined with a specific objective.

In a step S7, for example the at least one second fuel parameter is adapted as a function of the profile data record Rec and/or the resulting profile data record Rec_res. Alternatively or additionally, optimum operating parameters can also be determined for the drive system of the respective vehicle and/or optimum apportioning of energy types for the internal combustion engine and/or the electric drive can be determined.

In particular, in the step S7, at least one optimum fuel parameter F_opt can be determined. For example, it is possible to provide that a user predefines a selection and/or weighting of optimization criteria for the fuel use by means of a predefined operator control device of the first vehicle 10 and/or of the first mobile user apparatus 14.

Two or more options and relationships between the options can be displayed for simple predefining of the optimization criteria. At least two mutually influencing options can preferably be represented by means of a selection slider and/or spider diagram and/or a two-dimensional or three-dimensional selection space for selecting the optimization criteria. In this context, the optimization criteria can be positive, representing a value for a use which has been achieved or can be achieved, for example achieving maximum values, and/or negative, representing values for avoidance or reduction which has taken place or is possible (for example reduction of consumption, price, reduction of CO2 emissions and reduction of costs, and so on).

Alternatively or additionally, a set of possible changes of setting for the adaptation of the at least one second fuel parameter F2 can be determined as a function of the profile data record Rec, and the at least one second fuel parameter can then be determined as a function of a further predefined selection of the changes of setting.

At least one optimum fuel parameter F_opt and/or control signals which represent the at least one second fuel parameter can be determined as a function of the selected changes of setting and/or optimization criteria, and passed on to the gas station device, with the result that the gas station device can supply the correct quantities and fuel types.

For the optimization, it is also possible to take into account current or predicted peripheral conditions by virtue of the fact that the optimization also takes place as a function of the at least one second parameter P2_1.

Figure 3:
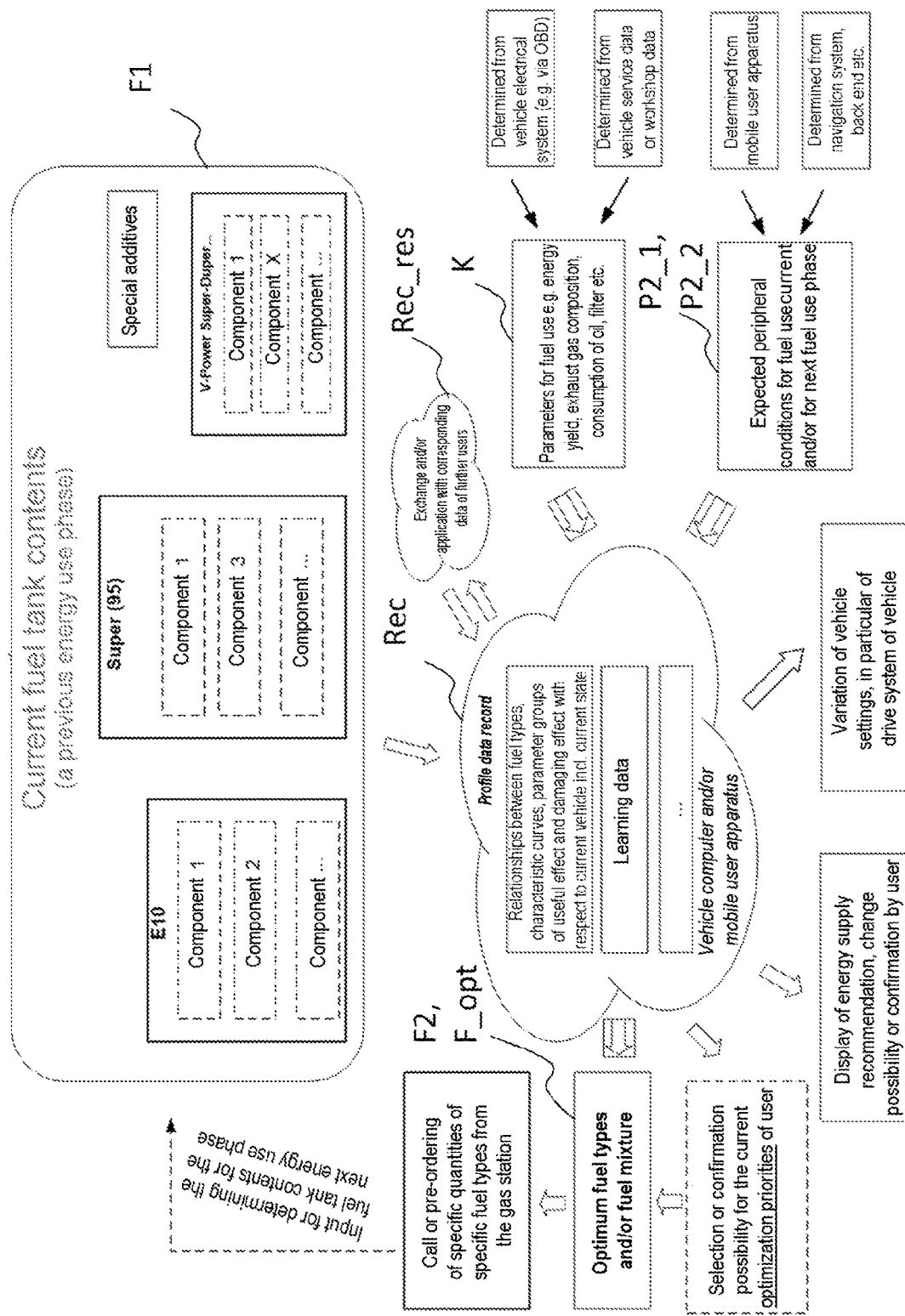
FIG. 3 is an exemplary block diagram for the program for adapting a fuel supply of at least one vehicle.

FIG. 3 shows an exemplary block diagram of the program for adapting a fuel supply of the first vehicle 10 or of the second vehicle 20.

The profile data record Rec is determined, for example, as a function of first fuel parameters F1, parameters P, which represent peripheral conditions of the fuel use, and the fuel use characteristic variables K.

The first vehicle 10 can use, for example, different fuel types, for example E10, Super95 and/or premium fuels, wherein the fuel types each comprise a plurality of different fuel components. The first vehicle 10 can optionally use, for example, various special additives for example additive agents. In order to characterize the respective fuel which is currently used in the first vehicle 10, values of at least one first fuel parameter F1 are determined and/or supplied. The at least one first fuel parameter F1 can include, for example, an octane number. The first fuel parameters F1 can, for example, be calculated mathematically from portions of types.

The values of the parameters P of the fuel use can be determined, for example, from navigation data and/or from weather data and/or calendar data. The values of the parameters P can be determined and supplied, for example, by the mobile user apparatus of the vehicle user and/or by a back end server.

The fuel use characteristic variables K can be determined from the vehicle service data and/or workshop data and/or from the vehicle electrical system.

The profile data record Rec includes, for example, relationships between fuel types, characteristic curves and/or parameter groups of useful effects and damaging effects with respect to the current vehicle. Alternatively or additionally, the profile data record Rec includes the learning data.

The at least one second fuel parameter F2 of the fuel which is used by the first vehicle 10 or by the second vehicle 20 during a second fuel use process is adapted as a function of the profile data record Rec. In particular, the second fuel parameter is adapted in such a way that an optimized and/or preferred fuel type or fuel mixture is obtained.

The determination of the optimized or preferred fuel can optionally take place as a function of predefinition of optimization priorities by the respective vehicle user.

In each case, for example at a gas station, a desired quantity of one or more fuel types which are supplied by the gas station can be pre-ordered and/or called as a function of the determined adaptation of the at least one second fuel parameter.

Alternatively or additionally, for example a fuel supply recommendation for the respective vehicle user and/or a recommendation to change a planned fuel supply and/or confirmation of a planned fuel supply can be displayed as a function of the profile data record Rec.

Alternatively or additionally, for example control signals which are representative of at least one operating parameter of the drive system and/or one state of the drive system to be reached can be determined as a function of the profile data record Rec. Configuration values, relationships between the latter and/or data of the drive system in the first vehicle 10 or the second vehicle 20 can be checked as a function of the control signals.

The data acquired during the refueling process, in particular data relating to fuel types and the respectively refueled quantity, can be used to determine the at least one second fuel parameter F2 for the next fuel use process.

LIST OF REFERENCE SYMBOLS 10 first vehicle
12 first control device of the first vehicle
14 first mobile user apparatus
20 second vehicle
22 second control device of the second vehicle
24 second mobile user apparatus
F1 first fuel parameter
F2 second fuel parameter
F_opt optimized fuel parameter
K fuel use characteristic variable
P parameter
P2_1 second parameter relating to the first vehicle
P2_2 second parameter relating to the second vehicle
Rec profile data record
Rec_res resulting profile data record The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adapting vehicle fuel supply, comprising the acts of:
executing N fuel use processes of one or more vehicles, including a first vehicle, wherein each of the N fuel use processes is a fuel use process executed at an Nth time, using a fuel having a fuel parameter that affects a fuel use characteristic resulting from the fuel use process, and wherein the fuel use characteristic is also affected by a peripheral condition ancillary to the N fuel use processes,
sensing: (a) values of the fuel use characteristic for the N fuel use processes, and (b) values of the peripheral condition for the N fuel use processes;
based on the sensed values of the fuel use characteristic and the peripheral condition, determining a mathematical relationship between the fuel use characteristic and the peripheral condition;
generating respective profiles for the one or more vehicles, each respective profile based on the mathematical relationship, wherein each respective profile includes: a profile data record and/or learning data reflecting an adaptation of the fuel parameter as a function of the peripheral condition values so as to achieve target values of the fuel use characteristic, and a corresponding adaptation of an operating parameter of a drive system of the vehicle;
determining, as a function of each respective profile, a target value of the fuel parameter corresponding to a target value of the fuel use characteristic; and
transmitting a control signal to a vehicle-external fuel supply so as to adapt fuel supplied to the first vehicle and/or a second vehicle during a refueling process for an N+m fuel use process such that the supplied fuel has the target value of the fuel parameter, wherein the N+m fuel use process is the fuel use process at an N+m time.

2. The method according to claim 1, wherein the fuel parameter reflects a quality of fuel.

3. The method according to claim 2, wherein the profile reflects the fuel parameter as a function of the operating parameter.

4. The method according to claim 1, wherein the profile represents one or more adaptation variants of the fuel parameter and corresponding adaptation variants of the operating parameter, with respect to the peripheral condition, such that the target value for the fuel use characteristic is achieved in the N+m fuel use process via the adaption variants.

5. The method according to claim 1, wherein a fuel supply is varied as a function of the profile.

6. The method according to claim 1, wherein a composition of fuel into an internal combustion engine is varied in the N+m fuel use process as a function of the profile.

7. The method according to claim 1, further comprising:
sensing values for at least one other peripheral condition, wherein the mathematical relationship is between the fuel use characteristic, the peripheral condition and the at least one other peripheral condition, and is determined based also on the at least one other peripheral condition,
wherein the learning data reflect the adaptation of the fuel parameter as a function of the peripheral condition values and the at least one other peripheral condition values so as to achieve target values of the fuel use characteristic.

8. The method according to claim 1, further comprising:
determining at least one optimum time or time interval for the refueling process as a function of the peripheral condition and one or more optimization criteria.

9. The method according to claim 1, further comprising:
determining a current composition of fuel in a fuel tank of the vehicle;
optimizing the target value of the fuel parameter as a function of the peripheral condition values, including predicted peripheral condition values, and one or more predefined optimization criteria; and
determining, for the refueling, proportions of various fuel types and/or mixture ratios of predefined fuel components for achieving the optimized target value, as a function of the current composition of fuel in the fuel tank and at least one fuel component.

10. The method according to claim 1, further comprising:
determining at least one of the following as a function of the profile data record: a state of wear and/or a change in the state of wear of one or more vehicle components, a degree of wear and/or a change in the degree of wear of one or more vehicle components, and a remaining service life and/or a change in the remaining service life of one or more vehicle components.

11. The method according to claim 1, wherein the fuel use characteristic indicates a degree of wear and/or of consumption and/or a reduction in a remaining service life of a vehicle component.

12. The method according to claim 1, wherein the peripheral condition is a state and/or a remaining service life of one or more vehicle components of the vehicle.

13. The method according to claim 1, wherein the peripheral condition is an energetic efficiency level of the fuel use process.

14. The method according to claim 1, wherein the target value of fuel parameter is determined as a function of authentication and/or compatibility testing of the respective profile data records.

15. The method according to claim 1, further comprising:
determining a set of settings changes for the fuel use process as a function of the respective profile data records; and
determining the target value of the fuel parameter as a function of the set of settings changes.

16. The method according to claim 1, further comprising:
determining a further profile, including a further profile data record, for a further vehicle as a function of the profile data record of the vehicle and/or the respective profile data records, and a predefined conversion data record, wherein a vehicle type of the further vehicle differs from a vehicle type of the first vehicle.

17. The method according to claim 1, further comprising:
interpolating and/or extrapolating the profile data record so as to determine values of the peripheral condition; and
determining the target value of the fuel parameter as a function of the interpolated and/or extrapolated profile data record.

18. The method according to claim 2, further comprising the acts of:
determining values of the fuel parameter; and
determining, on a basis of iterative optimization, a global optimum of the fuel use characteristic, for at least two optimization criteria, as a function of the fuel parameter.

19. The method according to claim 1, wherein the fuel parameter reflects at least one fuel use byproduct and/or reflects an information item representative of handling the at least one fuel use byproduct.

20. The method according to claim 2, further comprising: determining the fuel use characteristic as a function of a predefined statistical function which represents one or more static relationships between:
   at least two fuel parameters, and/or
   at least two peripheral conditions, and/or
   at least one fuel parameter and at least one peripheral condition determined during a plurality of fuel use phases.

21. The method according to claim 1, further comprising: the fuel use characteristic by sensing one or more variables representative of: at least one exhaust gas characteristic variable, a torque characteristic curve actually reached, at least one detection variable of a knocking sensor of an internal combustion engine of the vehicle, and/or one or more ignition angles and/or ignition times.

22. The method according to claim 1, further comprising: determining and outputting graphic user information representing one or more changes with respect to the N+m fuel use process, which changes have been or are carried out as a function of the profile data record or are proposed to a user.

23. A device for adapting vehicle fuel use, the device comprising:
   a control unit configured to:
      receive sensed values of a fuel use characteristic of N fuel use processes of the one or more vehicles, including a first vehicle, wherein each of the N fuel use processes is a fuel use process at an Nth time, using a fuel having a fuel parameter that affects a fuel use characteristic resulting from the fuel use process;
      receive sensed values of a peripheral condition of the first fuel use process, wherein the peripheral condition is ancillary to the fuel use process but affects the fuel use characteristic;
      determine a mathematical relationship between the fuel use characteristic and the peripheral condition, based on the sensed values of the fuel use characteristic and the peripheral condition;
      generate respective profiles for the one or more vehicles, each respective profile based on the mathematical relationship, wherein each respective profile includes: a profile data record and/or learning data reflecting an adaptation of the fuel parameter as a function of the peripheral condition values so as to achieve target values of the fuel use characteristic, and a corresponding adaptation of an operating parameter of a drive system of the vehicle;
      determine, as a function of each respective profile, a target value of the fuel parameter corresponding to a target value of the fuel use characteristic; and
      transmitting a control signal to a vehicle-external fuel supply so as to adapt fuel supplied to the first vehicle and/or a second vehicle for an N+m fuel use process such that the supplied fuel has the target value of the fuel parameter, wherein the N+m fuel use process is the fuel use process at an N+m time.

24. A mobile user apparatus, comprising:
   a fuel use determination unit configured to determine:
      sensed values of a fuel use characteristic of N fuel use processes of one or more vehicles, including a first vehicle, wherein each of the N fuel use processes is a fuel use process at an Nth time, using a fuel having a fuel parameter that affects a fuel use characteristic resulting from the fuel use process, and
      sensed values of a peripheral condition of the first fuel use process, wherein the peripheral condition is ancillary to the fuel use process but affects the fuel use characteristic;
   a mathematical relationship determination unit configured to determine a mathematical relationship between the fuel use characteristic and the peripheral condition based on the sensed values of the fuel use characteristic and the peripheral condition;
   a profile data record supplying unit configured to supply respective profiles for the one or more vehicles, each respective profile generated based on the mathematical relationship, at a data interface, wherein each respective profile includes: a profile data record and/or learning data reflecting an adaptation of the fuel parameter as a function of the peripheral condition values so as to achieve target values of the fuel use characteristic, and a corresponding adaptation of an operating parameter of a drive system of the vehicle,
   wherein the fuel use determination unit is further configured to:
      determine, as a function of each respective profile, a target value of the fuel parameter a target value of the fuel use characteristic, and
      cause the transmission of a control signal to a vehicle-external fuel supply so as to adapt fuel supplied to the first vehicle and/or a second vehicle for an N+m fuel use process such that the supplied fuel has the target value of the fuel parameter, wherein the N+m fuel use process is the fuel use process at an N+m time.

25. A computer program product comprising non-transitory executable program code which, when executed by a data processing device, is configured to:
   receive sensed values of a fuel use characteristic of N fuel use processes of one or more vehicles, including a first vehicle, wherein each of the N fuel use processes is a fuel use process at an Nth time, using a fuel having a fuel parameter that affects a fuel use characteristic resulting from the fuel use process;
   receive sensed values of a peripheral condition of the first fuel use process, wherein the peripheral condition is ancillary to the fuel use process but affects the fuel use characteristic;
   determine a mathematical relationship between the fuel use characteristic and the peripheral condition, based on the sensed values of the fuel use characteristic and the peripheral condition;
   supply respective profiles for the one or more vehicles, each respective profile, generated based on the mathematical relationship, wherein each respective profile includes: a profile data record and/or learning data reflecting an adaptation of the fuel parameter as a function of the peripheral condition values so as to achieve target values of the fuel use characteristic, and a corresponding adaptation of an operating parameter of a drive system of the vehicle;
   determine, as a function of each respective profile, a target value of the fuel parameter corresponding to a target value of the fuel use characteristic; and
   transmitting a control signal to a vehicle-external fuel supply so as to adapt fuel supplied to the first vehicle and/or a second vehicle for an N+m fuel use process such that the supplied fuel has the target value of the fuel parameter, wherein the N+m fuel use process is the fuel use process at an N+m time.

\* \* \* \* \*